(No Model.)  2 Sheets—Sheet 1.

H. KOEPP.
MACHINE FOR CUTTING MEAT.

No. 403,846.  Patented May 21 1889.

Witnesses:  Inventor.
O. N. Keeney,  Henry Koepp
Anna Faust  By Ennis & Benedict
  Attorneys.

(No Model.) 2 Sheets—Sheet 2.
H. KOEPP.
MACHINE FOR CUTTING MEAT.
No. 403,846. Patented May 21 1889.
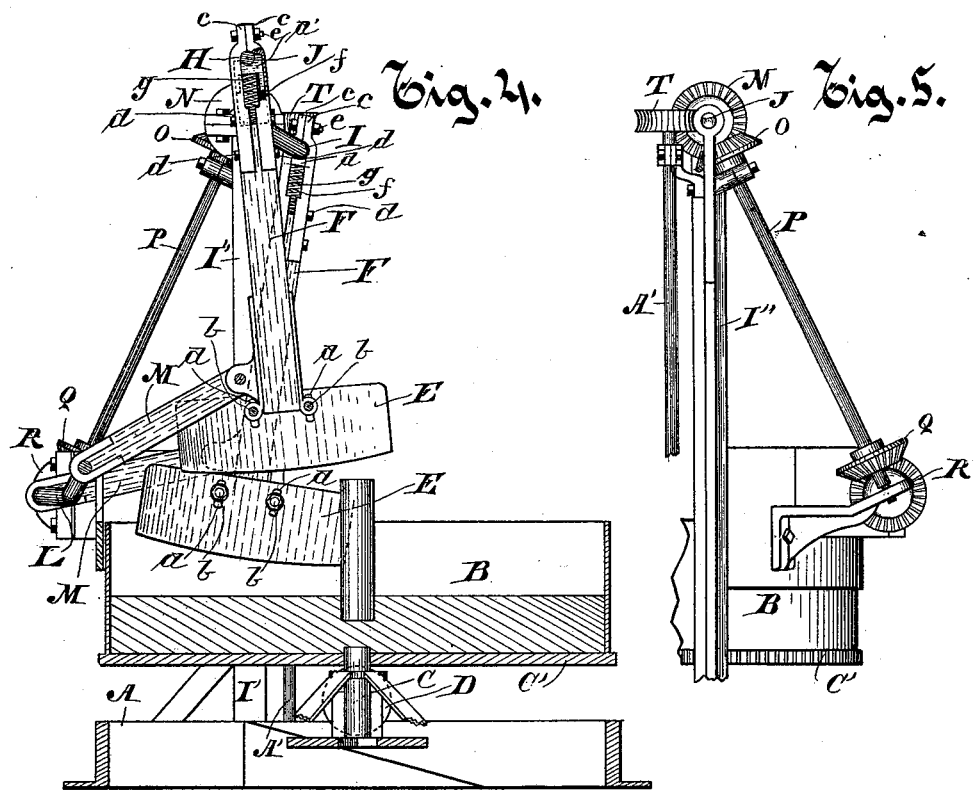

UNITED STATES PATENT OFFICE.

HENRY KOEPP, OF MILWAUKEE, WISCONSIN, ASSIGNOR OF ONE-HALF TO FREDERICK Z. NEDDEN, OF SAME PLACE.

MACHINE FOR CUTTING MEAT.

SPECIFICATION forming part of Letters Patent No. 403,846, dated May 21, 1889.

Application filed October 11, 1888. Serial No. 287,823. (No model.)

*To all whom it may concern:*

Be it known that I, HENRY KOEPP, of Milwaukee, in the county of Milwaukee and State of Wisconsin, have invented new and useful Improvements in Machines for Cutting Meat; and I do hereby declare the following to be a full, clear, and exact description of said invention, reference being had to the accompanying drawings, and to the letters or figures of reference marked thereon, which form a part of this specification.

My invention relates to improvements in machines for cutting meat, and pertains to that class in which the meat is cut upon a rotating block by a series of cutting-knives which alternately descend upon it.

Heretofore it has been common with this class of invention to allow the knives to descend in a direct line upon the meat, whereby the same is chopped in pieces.

The object of my improvement is to provide a device for communicating a horizontal movement to the knives as they descend upon the meat, whereby the meat is severed by a drawing cut, and whereby a portion only of the cutting-edges of the descending knives are brought in contact with the meat at the same time.

My invention is further explained by reference to the accompanying drawings, in which—

Figure 1:
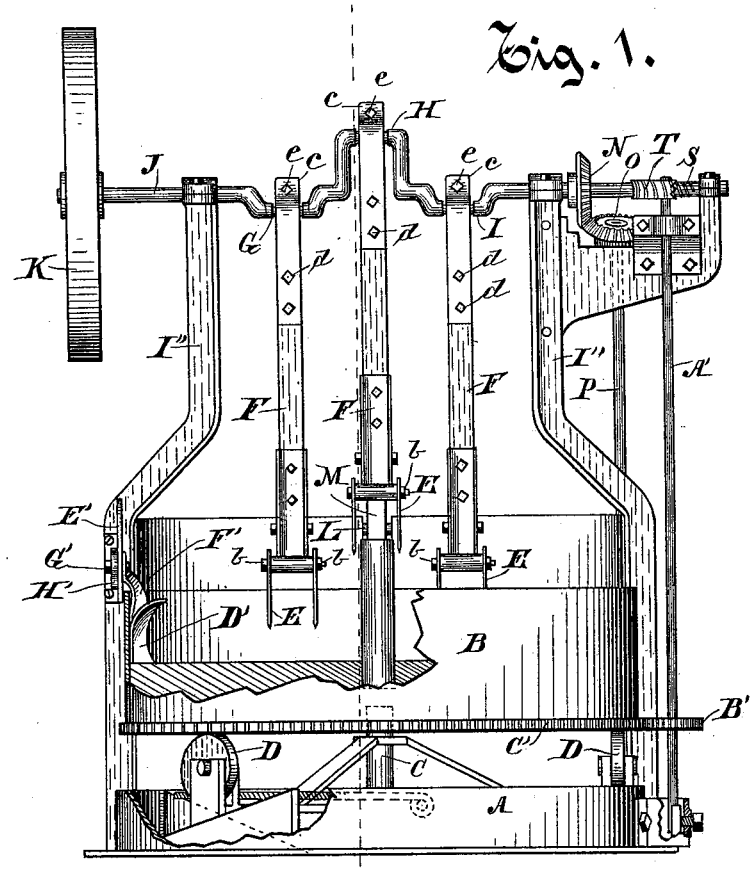
Figure 2:
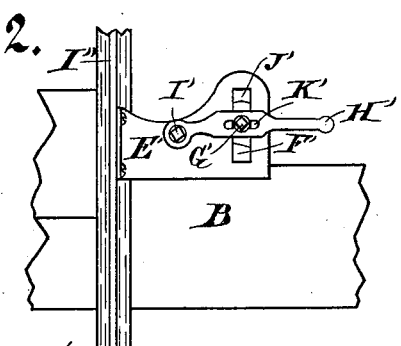
Figure 3:
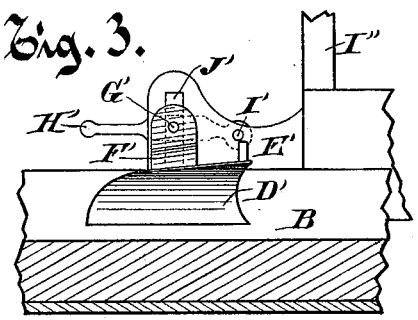

Figure 1 represents a side view thereof, part in section. Figs. 2 and 3 are details. Fig. 4 represents a vertical section drawn at right angles to that shown in Fig. 1. Fig. 5 is a detail.

Like parts are represented by the same reference-letters throughout the several views.

The base or stationary support A, the rotating meat-block B, provided with the central supporting-post, C, and rollers D, are all of the ordinary construction and form no part of my present invention, except as combined therewith, as hereinafter described.

E E E are the cutting-knives, which are secured in pairs to the lower ends of the knife-bars F F F. The knife-bars F are connected, as hereinafter described, at both their upper and lower ends with separate cranks, whereby the peculiar compound movement is communicated to them by which the drawing cut referred to is communicated to the knives. The upper ends of the knife-bars F are connected to the arms G, H, and I of the crank-shaft J at uniform distances apart upon the circle described by said arms, whereby but one set of knives E is permitted to come in contact with the meat at a time, and as one descends another ascends, and the third is at an intermediate point between the other two. Shaft J, with its connections, is supported from the stationary base A by the vertical standards I''. Motion is communicated to the shaft J by a belt through the fly-wheel K. The lower ends of the knife-bars F are connected to the arms G, H, and I of the crank-shaft J at uniform distances apart upon the circle described by said arms, whereby but one set of knives E is permitted to come in contact with the meat at a time.

The crank-shaft J, with its connections, is supported from the stationary base A by the vertical standards I''. Motion is communicated to the crank-shaft J by a belt through the fly-wheel K. The lower ends of the knife-bars F are in like manner connected with the three-armed crank-shaft L, of similar construction to that of the upper crank-shaft, J, at uniform distances apart upon the circle described by said arms by the connecting-bars M, whereby as said crank-shaft L rotates a swinging movement is communicated to the lower ends of the cutting-knives, which, in connection with the vertical movement, produces a drawing cut upon the meat, as mentioned. Motion is communicated to the crank-shaft L from the crank-shaft J through the beveled gears N and O, shaft P, and beveled gears Q and R, whereby both crank-shafts are simultaneously rotated. Motion is also communicated from the crank-shaft J to the meat-block B through the worm-gear S, formed on the end of shaft J, gear-pinion T, shaft A', pinion B', and toothed wheel C', whereby said meat-block is caused to continuously rotate beneath said cutting-knives, and the knives are brought in contact with all parts of the surface of the block. As the meat is being thus cut, it is turned over and thrown inwardly toward the center of the meat-block and beneath the knives by the plow or curved plate D'. The curved plate D' is connected with the stationary bracket E' through the upward-projecting arm F', pivot G', lifting-arm H', and pivot I'. A slot, J', is formed in the bracket E' for the reception of the bolt G', which extends through said slot from the arm F', and is affixed to the handle or lever H' in the slot K'. Thus it is obvious that the plow or curved plate D' may be raised and lowered by raising and lowering the handle or arm H'. The slot K' permits of the circular movement of said arm H' upon the bolt or pivot G' as said plow is raised and lowered. The cutting-knives E are provided with slots $a\ a$, as shown in Fig. 4, for the reception of the knife-retaining bolts $b\ b$, which slots permit of any slight adjustment of the knives, as may be required. The journal-bearings by which the knife-bars F are connected to the arms of the crank-shaft J are preferably formed in two parts, $c\ c$, which parts are secured to the bars F by bolts $d\ d$, and their upper ends are secured together above the arms of the crank-shaft by bolts $e$. Beneath each of the eccentric arms is a movable journal-block or bearing, $a'$, located in a retaining groove or recess, $f$, formed in said parts $c\ c$. The movable blocks or bearings $a'$ are retained in contact with the under side of the journal-bearings of the crank-shaft J by spiral springs $g$, which springs yield slightly as the knives drop upon the block and relieve the eccentric arms of the shock or strain that would otherwise be transmitted to them.

Having thus described my invention, what I claim as new, and desire to secure by Letters Patent, is—

1. In a meat-cutting machine, the combination, with the knife-bars F and the thereto-attached knives, of two crank-shafts, J and L, respectively connected with the respective ends of said knife-bars, and mechanism for rotating both of said crank-shafts, substantially as and for the purpose specified.

2. In a meat-cutter, the combination of the crank-shaft J, mounted in journal-bearings upon the supporting-standards I'' I'', knife-bars F, journaled at their upper ends to the arms of said crank-shaft J, crank-shaft L, connecting-bars M, pivoted at their upper ends to the lower ends of said knife-supporting bars F and journaled at their opposite ends to the arms of said crank-shaft L, knives E E, affixed to the lower ends of said bars F, and rotating meat-block B, all substantially as and for the purpose specified.

3. The combination, with the stationary frame of the machine, of the bracket E', provided with slot J', lever H', pivoted at one end to said bracket E' and provided with slot K', bolt or pin G', secured at one end to said lever H' within said slots J' and K' and at its opposite end to the plow-supporting arm F', arm F', and plow D', all substantially as and for the purpose specified.

In testimony whereof I affix my signature in presence of two witnesses.

HENRY KOEPP.

Witnesses:
JAS. B. ERWIN,
F. Z. NEDDEN.